(12) United States Patent
Winterbottom et al.

(10) Patent No.: US 8,189,247 B2
(45) Date of Patent: May 29, 2012

(54) SECURITY HOLOGRAMS

(75) Inventors: David Roy Winterbottom, Colchester (GB); John David Wiltshire, Cambridge (GB); Satyamoorthy Kabilian, Halstead (GB)

(73) Assignee: Ver-Tec Security Systems Limited, Essex (GB)

( * ) Notice: Subject to any disclaimer, the term of this patent is extended or adjusted under 35 U.S.C. 154(b) by 719 days.

(21) Appl. No.: 12/196,745

(22) Filed: Aug. 22, 2008

(65) Prior Publication Data
US 2009/0051986 A1 Feb. 26, 2009

(30) Foreign Application Priority Data

Aug. 23, 2007 (GB) .................................. 0716451.0

(51) Int. Cl.
*G03H 1/00* (2006.01)
(52) U.S. Cl. ......................................................... 359/2
(58) Field of Classification Search .................... None
See application file for complete search history.

(56) References Cited

U.S. PATENT DOCUMENTS

| | | | |
|---|---|---|---|
| 4,971,646 A | 11/1990 | Schell et al. | |
| 5,834,096 A | 11/1998 | Waitts | |
| 7,085,024 B2 * | 8/2006 | Ishimoto et al. | 359/2 |
| 2006/0289114 A1 | 12/2006 | Guionnet et al. | |

FOREIGN PATENT DOCUMENTS

| | | |
|---|---|---|
| EP | 0 754 987 A2 | 1/1997 |
| WO | WO 2006/077447 A2 | 7/2006 |

* cited by examiner

*Primary Examiner* — Derek S Chapel

(57) ABSTRACT

Improved techniques for using holograms to provide security for documents and the like. A method of providing a tamper-resistant pattern in association with a hologram on a substrate, the method including: preparing a hologram, the hologram being recorded in a photosensitive recording layer carried by a carrier; printing a pattern onto the photosensitive recording layer; and then attaching the hologram to a substrate by adhesive such that the pattern is between the photosensitive recording layer and the substrate to provide a tamper-resistant pattern in association with the hologram.

18 Claims, 4 Drawing Sheets

SECURITY HOLOGRAMS

RELATED APPLICATIONS

The present invention claims priority from British Patent Application No. GB 0716451.0, filed 23 Aug. 2007.

FIELD OF THE INVENTION

This invention relates to improved techniques for using holograms to provide security for documents and the like.

BACKGROUND TO THE INVENTION

Overlaying a security document such as a driving licence or passport with a hologram, which is difficult to copy, can afford additional security value. For example in the British passport document, embossed holography has been used in the form of a translucent thin layer coated on its reverse side with a layer of material such as zinc sulphide, whose refractive index is significantly higher than the carrier. Thus light is reflected from the interface in such a way as to reconstruct the holographic image, whilst permitting the viewer to see simultaneously, printed matter behind the holographic film.

The idea is that an attempt to remove the covering layer will result in destruction of the document but in practice one of the most common forms of passport/ID forgery is where the protective laminate is lifted off, allowing the print underneath to be tampered with or the laminate to be reused on other documents. Background prior art can be found in EP 0 754 987A, WO 2006/077447 A2, U.S. Pat. Nos. 4,971,646A, 5,834,096 A and US 2006/0289114 A1.

There is therefore a need for improved anti-counterfeiting techniques for security documents and the like.

SUMMARY OF THE INVENTION

According to a first aspect of the invention there is therefore provided a method of providing a tamper-resistant pattern in association with a hologram on a substrate, the method comprising: preparing a hologram, said hologram being recorded in a photosensitive recording layer carried by a carrier; printing a light amplitude modulating pattern onto said photosensitive recording layer to stain a surface of said photosensitive recording layer; and then attaching said hologram to a substrate by adhesive such that said pattern is between said photosensitive recording layer and said substrate to provide a tamper-resistant pattern in association with said hologram.

In some preferred embodiments of the technique at least an upper surface of the photosensitive recording layer comprises gelatine. For example the photosensitive medium may comprise dichromated gelatine (DCG) or a silver halide gelatine recording medium may be employed in which optionally a supercoat or non-stress plain gelatine layer is provided over the silver halide to give protection from mechanical abrasion. Such a gelatine surface provides a particularly advantageous medium for printing inks or pigments onto the photosensitive material (the inventors have observed that gelatine layers are used as priming layers within the printing industry).

In embodiments the printing comprises inkjet printing; the printing may be "in reverse" so that when it is viewed through the (transparent) carrier base it appears correct. In embodiments the printing may be full colour.

It is particularly preferred that the hologram is a volume hologram since not only does this provide increased difficulty of copying, unlike embossed holograms there is a smooth upper surface on which to print.

In other embodiments, additionally or alternatively to the above-described printing, a covert or overt pattern may be formed using the adhesive. Thus in embodiments at least two types of adhesive are employed to create the pattern, for example one clear, another opaque (they may otherwise essentially be of the same composition). In more complex systems multiple colours may be employed for example to create a full colour pattern with the adhesive. In embodiments the different types of adhesive are visually distinguishable either directly or indirectly, say using a camera and UV/IR illumination or in some other way.

The different types (colours) of adhesive may be deposited by inkjet printing. Alternatively a transfer-type technique may be employed by selectively treating a carrier for the adhesive say by mechanical roughening or corona discharge so that when the adhesive is applied to the photosensitive recording layer it is only partially transferred from the carrier to give rise to the desired pattern (the pattern may comprise, for example, a pattern of dots each dot defining a region of "subbing" surface treatment).

In embodiments the method further comprises selecting a pattern to be printed, so that different substrates have different patterns. Thus, for example, the pattern may comprise a graphical or alphanumeric identification code, say to allow product tracking. Additionally or alternatively the pattern may be linked to or derived from the hologram preferably to provide a substantially unique identity. For example the hologram may comprise a biometric image and the pattern a code or identifier derived from this. The use of a volume hologram facilitates such techniques because each hologram may contain individually unique graphic content recorded in the "live" photosensitive material at a mass-production stage.

Optionally once the hologram has been attached to the substrate the carrier may be removed, as described in more detail in our earlier published patent application WO 2006/056810 (the contents of which are hereby incorporated by reference in their entirety), to provide the advantage of a thinner layer over the substrate.

The substrate may comprise a paper or plastic-based security document such as a passport, visa, identity card, driving licence, government bond, banknote, Bill of Exchange, or the like or some similar note, document, material or card such as packaging or labelling. The skilled person will understand, however, that other substrate materials such as metal or glass may alternatively be employed.

In a related aspect the invention provides a substrate bearing a hologram and a tamper-resistant pattern, said hologram being recorded in a photosensitive recording layer, said photosensitive recording layer having a surface attached by adhesive to said substrate, and wherein said tamper-resistant pattern is printed onto said surface of said photosensitive recording layer.

As previously described, in preferred embodiments the surface of the photosensitive recording layer comprises gelatine and the printed pattern comprises ink or pigment. Additionally or alternatively one or more types of adhesive may be employed to form a pattern either overtly or covertly, optionally a full colour pattern.

In embodiments an identification code or serial number may be patterned in the adhesive, for example substantially invisibly in clear adhesive so as to provide a tamper-evident feature comprising a product tracking facility. This may be achieved, for example, by providing a patterned surface treatment and/or different types/strengths of adhesive so that if the carrier is removed a pattern is left on the substrate and/or carrier-hologram combination. A method of fabricating such a system may include keeping a record of the identification code or serial number in a database for future reference/tracking.

In some preferred embodiments the hologram comprises a volume reflection hologram.

BRIEF DESCRIPTION OF THE DRAWINGS

These and other aspects of the invention will now be further described, by way of example only, with reference to the accompanying figures in which.

In this specification we are particularly concerned with volume holography, especially (but not exclusively) volume reflection holography. A volume hologram is, here, a hologram in which the angle difference between the object and reference beams is equal to or greater than 90 degrees. Volume holograms are sometimes referred to as "thick" holograms since, roughly speaking, the fringes are in planes approximately parallel to the surface of the hologram, although in practice the thickness of the recording medium can vary significantly, say between 1 µm and 100 µm, and is typically around 7 µm. Broadly speaking a reflection hologram is a hologram which is constructed by interfering object and reference beams which are directed onto a recording medium from opposite sides of the medium.

Typical hologram recording materials include (but are not limited to) dichromated gelatine (DCG), silver halide, and photopolymer based materials. This material is generally mounted on a carrier, typically polyester, although other carriers such as triacetate or cellulose nitrate may be used. The carrier is typically of the order of ten times the thickness of the gelatin emulsion, for example ~75 µm thick, although carrier thickness can potentially range between ~5 µm and ~500 µm.

Figures 1A, 1B:
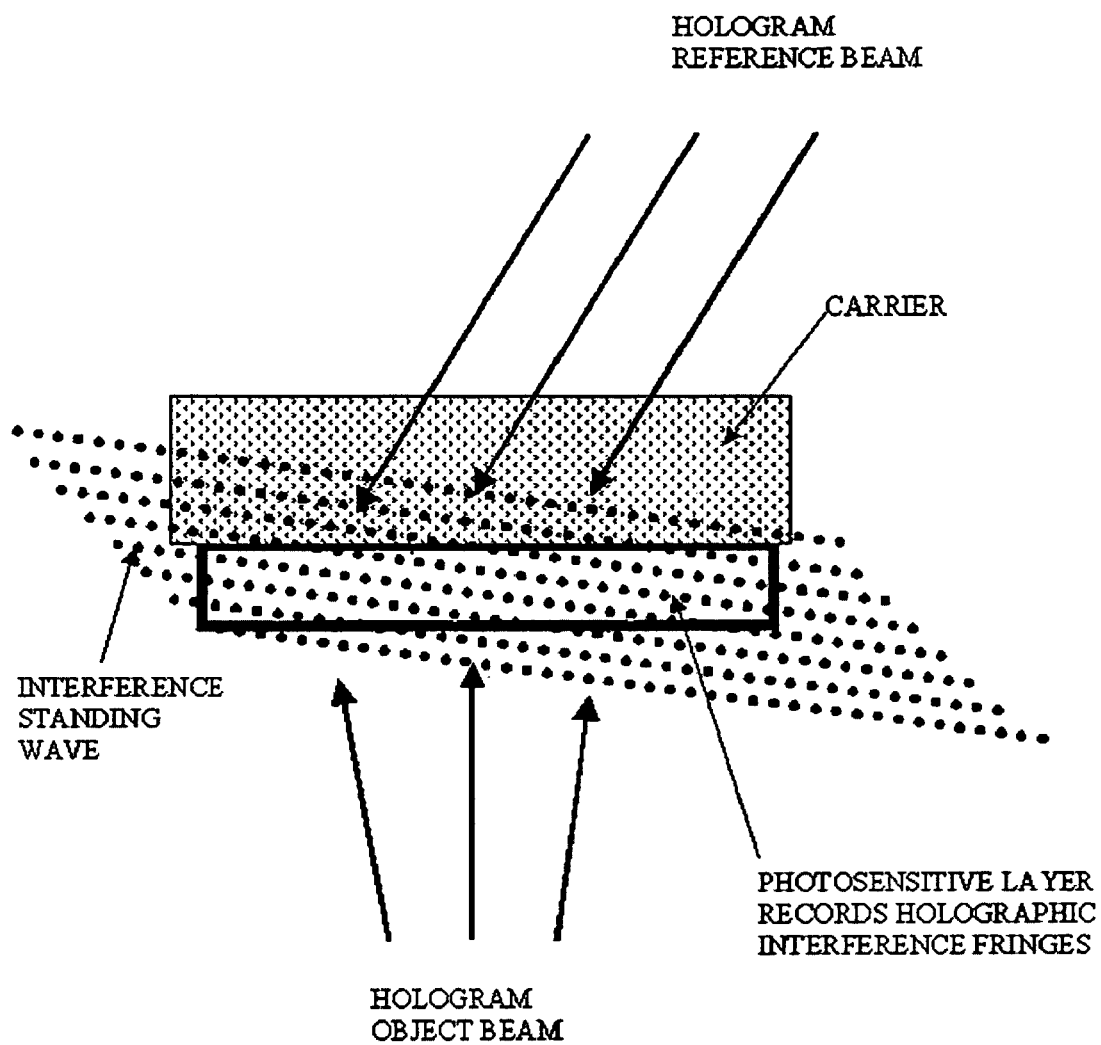
FIGS. 1a and 1b show, respectively, a process for recording a volume hologram, and a vertical cross-section through a security document incorporating a volume hologram.

Referring to FIG. 1a recording the hologram generally involves exposing the hologram to interfering light beams followed by subsequent processing to "fix" the hologram. The particular processing steps after exposure it will be appreciated depend upon the recording layer and may comprise, for example, developing techniques similar to those used for conventional photographic film, or other techniques such as (cross) polymerisation and/or baking. The techniques we describe herein are suitable for use with any conventional holographic recording material and carrier, including but not limited to those described above.

FIG. 1b shows, in outline, the hologram of FIG. 1a applied to a security document with the hologram carrier uppermost so that the photosensitive recording layer is sandwiched between the carrier and the (printed paper) substrate.

Figure 2:
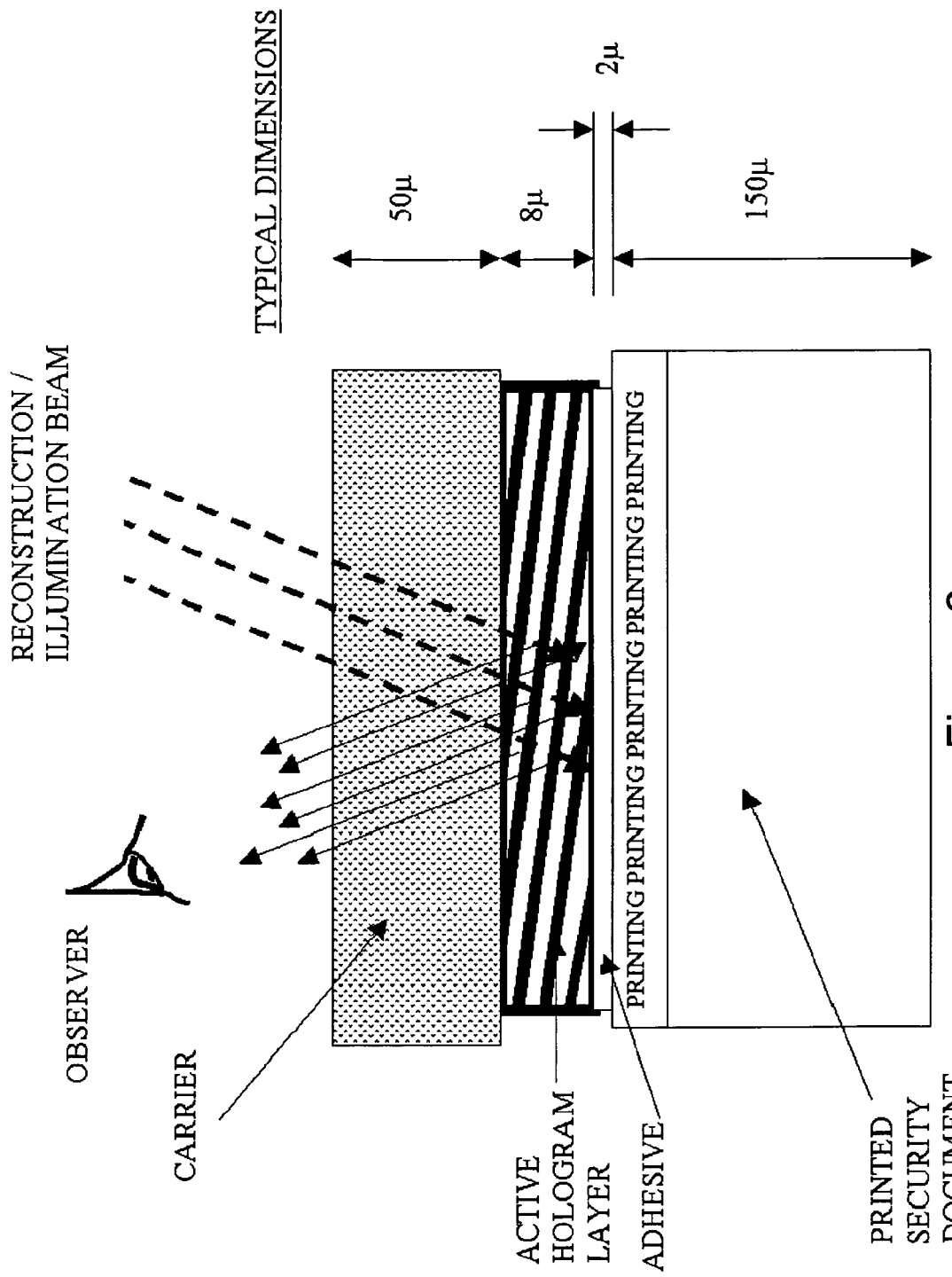
FIG. 2 shows the security document of FIG. 1b in more detail illustrating reconstruction of the volume reflection hologram.

FIG. 2 shows a vertical cross-section through the security document of FIG. 1b in more detail, illustrating some typical dimensions.

The inventors have recognised that the gelatine of the hologram recording material provides a particularly advantageous surface on which to print. The presence of a gelatine layer can be used to enhance the adhesion and potentially the definition of inks and pigments which are printed onto it. Thus, images or data may be printed onto the gelatine/emulsion surface of a hologram without adversely affecting the replay of the hologram.

Figure 3:
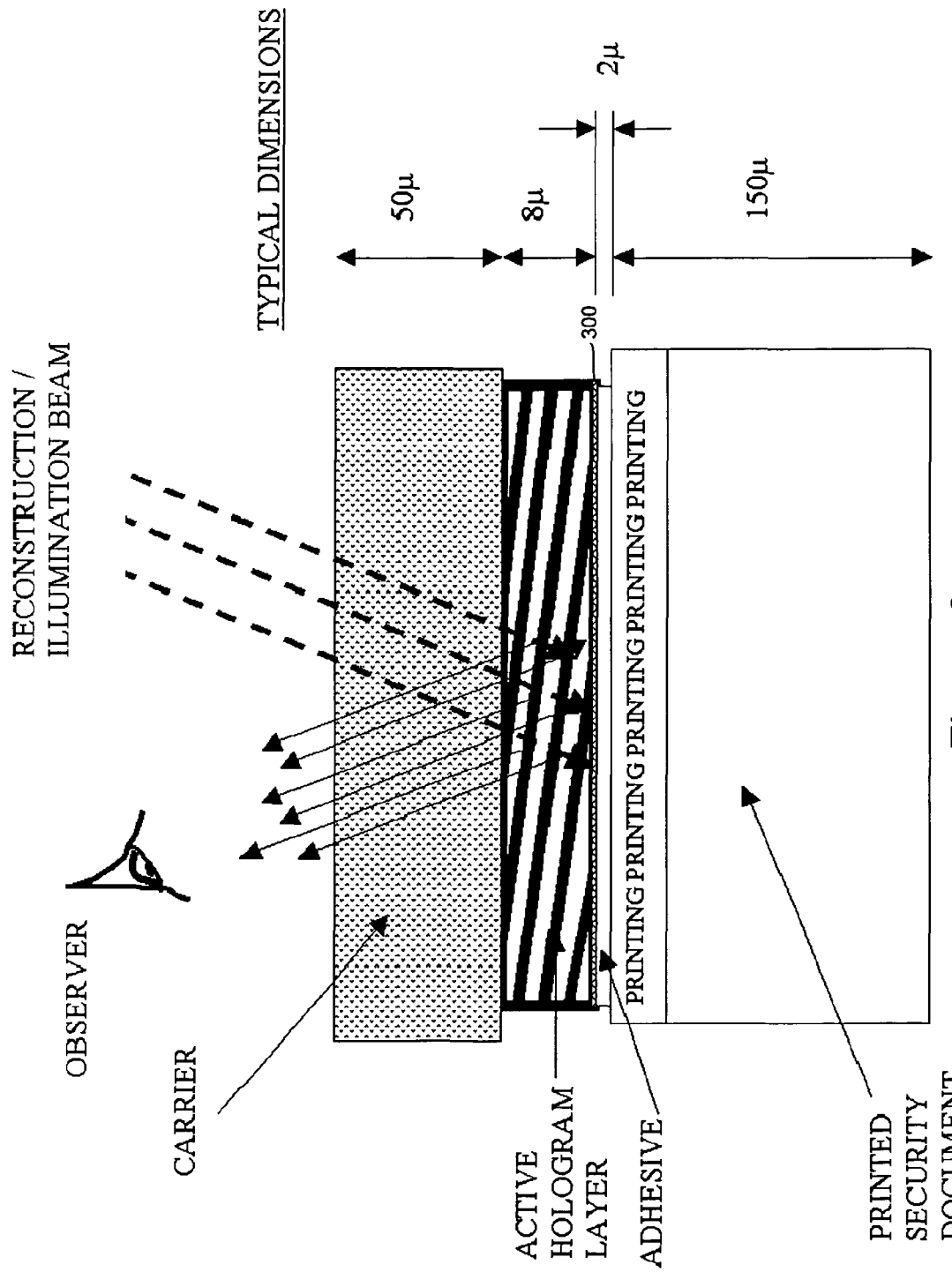
FIG. 3 shows a security document according to a first embodiment of the invention.

Referring now to FIG. 3, this shows an arrangement similar to that illustrated in FIG. 2 but with printing 300 on the layer of photosensitive material. The printed information is embedded into the hologram structure as the dyes will partially sink into the gelatine layer. This provides a secure system for storing printed data such as photographs, machine readable information, etc as the printed data becomes integral to the hologram rather than the surface onto which the hologram is adhered. In embodiments because the print becomes integral to the hologram layer or laminate forgery by removing the laminate to enable the print underneath to be tampered with is substantially prevented. Many passport issuing systems use inkjet printing and therefore this same technique is advantageously employed to print onto the holographic emulsion.

Figure 4:
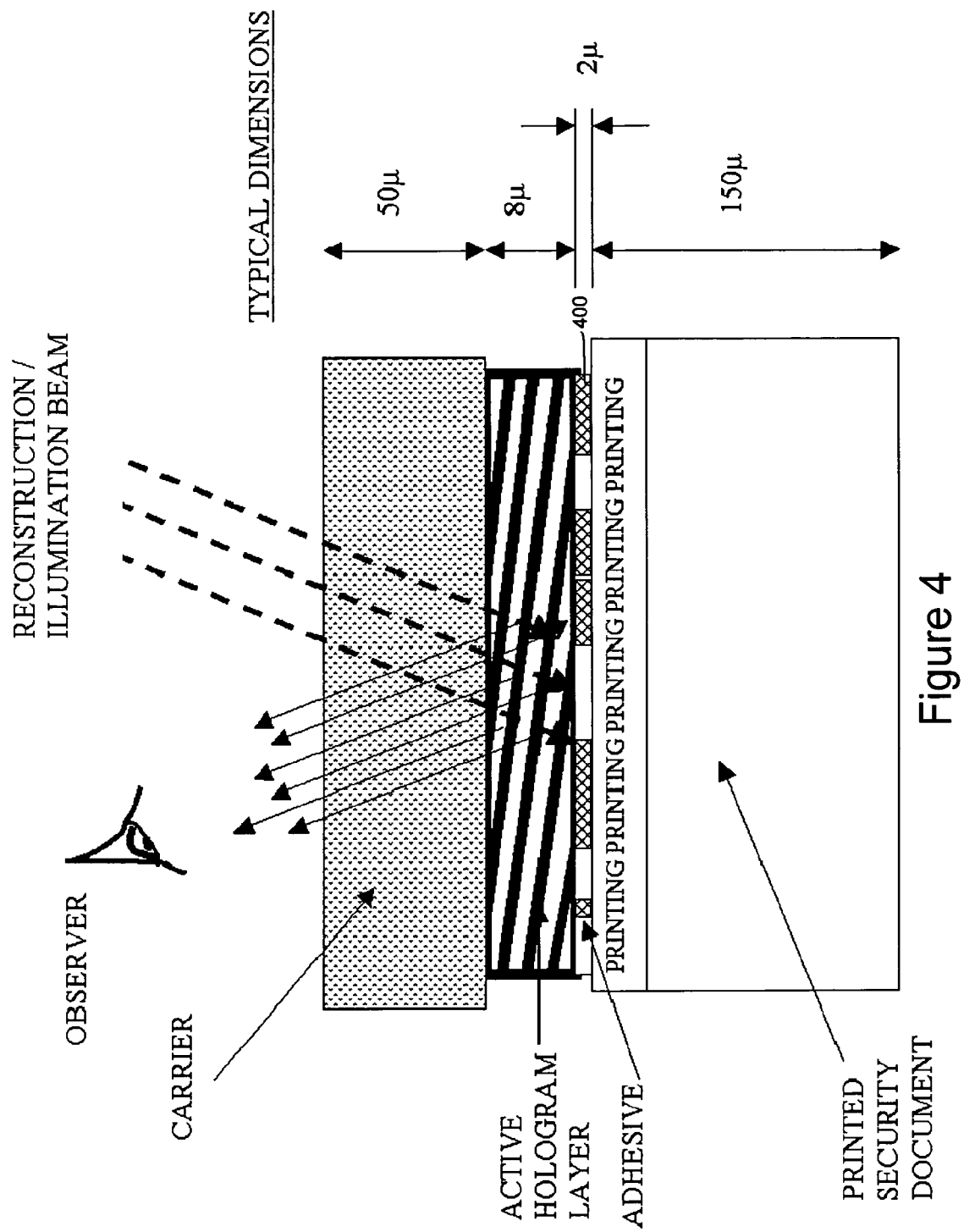
FIG. 4 shows a security document according to a second embodiment of the invention.

FIG. 4 shows an extension to this concept which may be employed additionally or alternatively to the technique illustrated in FIG. 3. In FIG. 4 the adhesive layer bears a pattern 400 of information or images formed by the printing of adhesives on the emulsion side of the volume hologram. In particularly preferred embodiments inkjet printing is employed to record variable/individualisable information in the adhesive. This may be made visible/overt by using coloured adhesives with negative or positive images printed with the adhesive. A covert effect may similarly be produced with a clear adhesive. Again, this creates data that is integral to the hologram and in embodiments cannot practically be separated from the hologram, increasing its security level.

No doubt many other effective alternatives will occur to the skilled person and it will be understood that the invention is not limited to the described embodiments but encompasses modifications apparent to those skilled in the art lying within the spirit and scope of the claims appended hereto.

The invention claimed is:

1. A method of providing a tamper-resistant pattern in association with a hologram on a substrate, the method comprising:
   preparing a hologram, said hologram being recorded in a gelatine photosensitive recording layer carried by a carrier;
   printing ink defining a light amplitude modulating pattern onto an unprotected surface of said gelatine photosensitive recording layer such that the ink sinks into and stains the gelatine photosensitive recoding layer; and then
   attaching said hologram to a substrate by adhesive such that said pattern is between said gelatine photosensitive recording layer and said substrate to provide a tamper-resistant pattern in association with said hologram.

2. A method as claimed in claim 1 further comprising applying a layer of said adhesive to said gelatine photosensitive recording layer after said printing.

3. A method as claimed in claim 1 wherein said printing of said pattern comprises using said adhesive to form said pattern.

4. A method as claimed in claim 3 wherein said printing of said pattern uses at least two visibly distinguishable types of adhesive, to create said pattern.

5. A method as claimed in claim 1 wherein said printing comprises ink jet printing.

6. A method as claimed in claim 1 further comprising selecting a said pattern to be printed, and wherein different substrates have different said patterns.

7. A method as claimed in claim 1 wherein said hologram comprises a volume reflection hologram.

8. A method of fabricating a security document, package or label using the method of claim 1.

9. A substrate bearing a hologram and a tamper-resistant pattern, said hologram being recorded in a gelatine photosensitive recording layer, said gelatine photosensitive recording layer having a surface attached by adhesive to said substrate, and wherein said tamper-resistant pattern is printed in ink onto the gelatine photosensitive recording layer such that the ink is embedded into and stains the gelatine photosensitive recoding layer.

10. A substrate as claimed in claim 9 wherein said printed pattern comprises ink or pigment.

11. A substrate as claimed in claim 9 wherein said surface comprises gelatine.

12. A substrate as claimed in claim 9 wherein said printed pattern comprises a pattern formed by said adhesive visible when said hologram is attached to said substrate.

13. A substrate as claimed in claim 9 wherein said printed pattern comprises a pattern formed by at least two types of adhesive.

14. A substrate as claimed in claim 9 wherein said printed pattern comprises an identification code.

15. A substrate as claimed in claim 9 wherein said pattern comprises a multicolour pattern.

16. A substrate as claimed in claim 9 wherein an individual identification code or serial number is revealed on detachment of said hologram from said substrate.

17. A substrate as claimed in claim 9 wherein said hologram comprises a volume reflection hologram.

18. A printed document, package or label comprising the substrate of claim 9.

\* \* \* \* \*